US009543645B2

United States Patent
Shirinfar et al.

(10) Patent No.: US 9,543,645 B2
(45) Date of Patent: Jan. 10, 2017

(54) REFLECTIVE BEAMFORMING FOR PERFORMING CHIP-TO-CHIP AND OTHER COMMUNICATIONS

(71) Applicant: Broadcom Corporation, Irvine, CA (US)

(72) Inventors: Farid Shirinfar, Los Angeles, CA (US); Maryam Rofougaran, Rancho Palos Verdes, CA (US); Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 119 days.

(21) Appl. No.: 14/613,982

(22) Filed: Feb. 4, 2015

(65) Prior Publication Data

US 2015/0145737 A1 May 28, 2015

Related U.S. Application Data

(63) Continuation of application No. 13/680,666, filed on Nov. 19, 2012, now Pat. No. 8,977,208.

(51) Int. Cl.
| | |
|---|---|
| *H01Q 3/00* | (2006.01) |
| *H04B 1/00* | (2006.01) |
| *H01Q 1/22* | (2006.01) |
| *H01Q 15/00* | (2006.01) |
| *H04B 15/00* | (2006.01) |

(52) U.S. Cl.
CPC .............. *H01Q 3/00* (2013.01); *H01Q 1/2283* (2013.01); *H01Q 15/006* (2013.01); *H04B 1/00* (2013.01); *H04B 15/00* (2013.01)

(58) Field of Classification Search
CPC ...... H01Q 1/2283; H01Q 3/00; H01Q 15/006; H04B 1/00; H04B 15/00
USPC .................... 455/41.2, 63.1, 67.13
See application file for complete search history.

(56) References Cited

U.S. PATENT DOCUMENTS

| | | |
|---|---|---|
| 2011/0181490 A1 | 7/2011 | Jung et al. |
| 2014/0141713 A1 | 5/2014 | Shirinfar et al. |

OTHER PUBLICATIONS

Sievenpiper. Dan, et al. "High-Impedance Electromagnetic Surfaces with a Forbidden Frequency Band," *IEEE Transactions on Microwave Theory and Techniques*, vol. 47, No. 11: 2059-2074 (Nov. 1999).

*Primary Examiner* — Raymond Dean
(74) *Attorney, Agent, or Firm* — Sterne, Kessler, Goldstein & Fox P.L.L.C.

(57) ABSTRACT

A transmitter front-end for wireless chip-to-chip communication, and for other, longer-range (e.g., several meters or several tens of meters) device-to-device communication is disclosed. The transmitter front-end can include a plurality of reflector power amplifiers implemented on an IC chip and an on-chip or on-package antenna for wireless transmitting a signal to another IC chip or device. The plurality of reflector power amplifiers can reflect the radiation of the on-chip or on-package antenna in a particular pattern such that the effective radiation pattern is reinforced in a desired direction and suppressed in an undesired direction. This helps to reduce the required output power of the transmitter front-end and mitigate interference with other potential wireless chip-to-chip or longer-range communications.

20 Claims, 6 Drawing Sheets

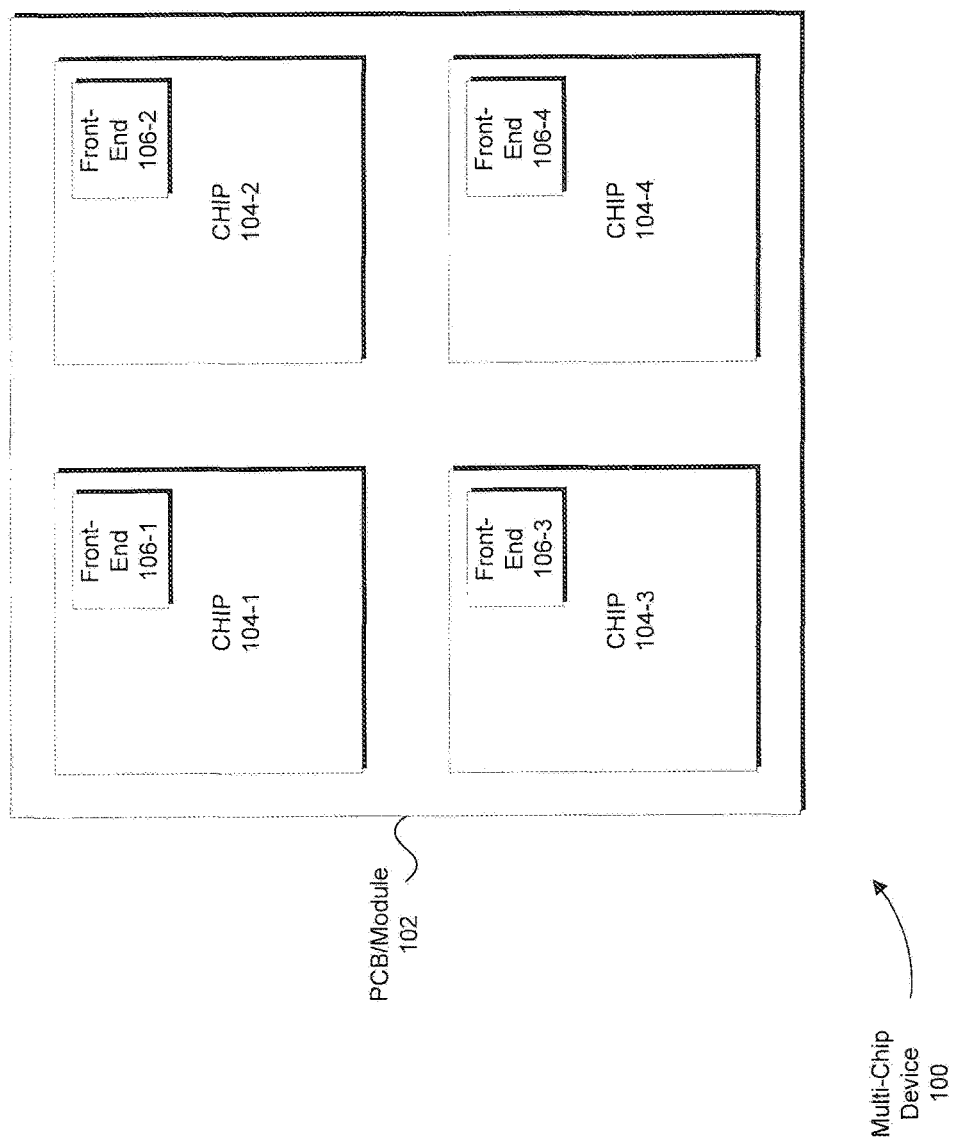

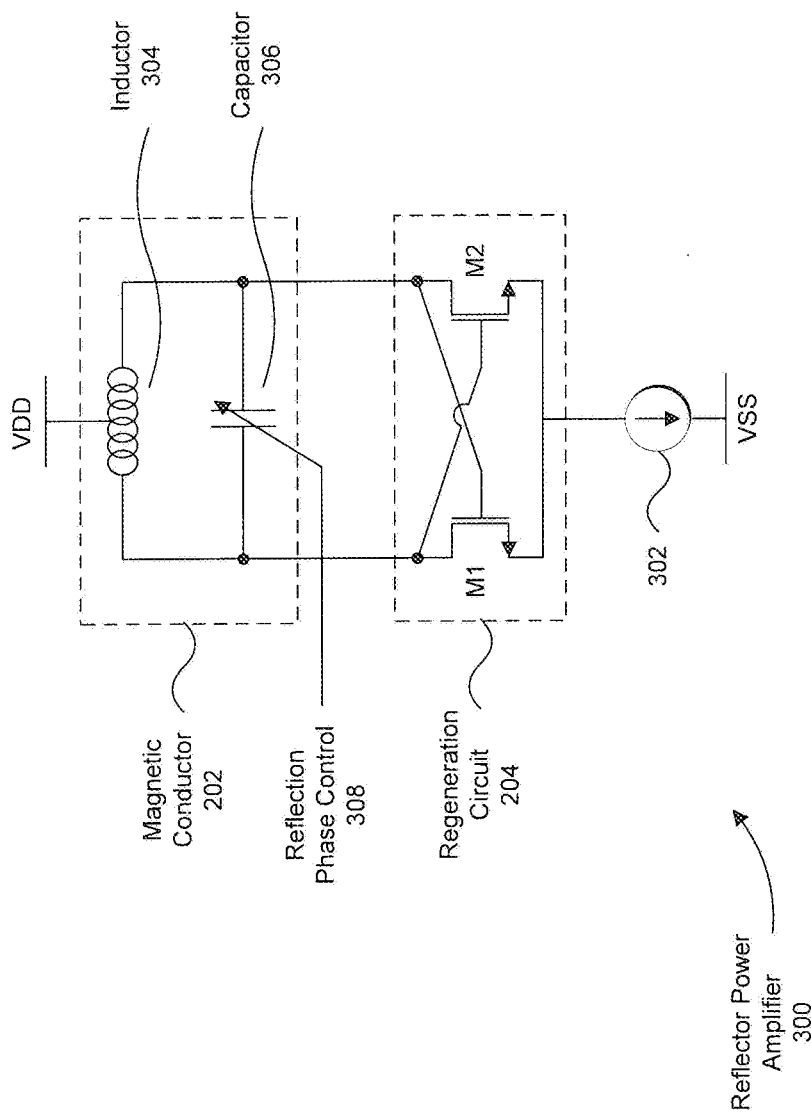

REFLECTIVE BEAMFORMING FOR PERFORMING CHIP-TO-CHIP AND OTHER COMMUNICATIONS

CROSS REFERENCE TO RELATED APPLICATIONS

This application is a continuation of U.S. patent application Ser. No. 13/680,666, filed on Nov. 19, 2012, which is incorporated herein by reference in its entirety.

TECHNICAL FIELD

This application relates generally to wireless communication and, more specifically, to wireless chip-to-chip communication and other, longer-range, communication.

BACKGROUND

Many devices today include multiple integrated circuit (IC) chips to carry out their functionalities. These IC chips often need to communicate with each other at very high data rates. For example, complex devices can include several IC chips on a printed-circuit board (PCB) that are required to communicate with each other at rates exceeding several gigabits per second (Gb/s), and these rates continue to increase with each new generation of devices. At such high rates, communication over electrical traces on a PCB becomes difficult due to, for example, impedance mismatches, the skin effect, and dielectric absorption, all of which lead to distortion and/or attenuation of a transmitted signal. Moreover, depending on the number of IC chips used, routing of electrical traces between the IC chips can be difficult on a PCB with limited area.

Wireless communication can be used to overcome the problems of electrical interconnection described above. For example, wireless communication is generally not constrained by PCB area limitations and enough unlicensed wireless spectrum exists to accommodate high data rates in the multi Gb/s range. In particular, there is 7 GHz of spectrum available for unlicensed wireless communication in the 60 GHz band, from 57-64 GHz in the United States and Canada and from 59-66 GHz in Japan. This spectrum can be used to accommodate high data rate wireless chip-to-chip communications in the multi Gb/s range.

However, for any such wireless chip-to-chip communication solution, and potentially for other, longer-range communication solutions (e.g., several meters or several tens of meters) between devices, it is desirable that the required hardware be compact, cheap, and power-efficient. Current solutions for wireless chip-to-chip and device-to-device communication typically fail to achieve one or more of these often competing criteria.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 illustrates a multi-chip device in which embodiments of the present disclosure can operate.

FIG. 3 illustrates an exemplary reflector power amplifier in accordance with embodiments of the present disclosure.

The embodiments of the present disclosure will be described with reference to the accompanying drawings. The drawing in which an element first appears is typically indicated by the leftmost digit(s) in the corresponding reference number.

DETAILED DESCRIPTION

Figure 2A:
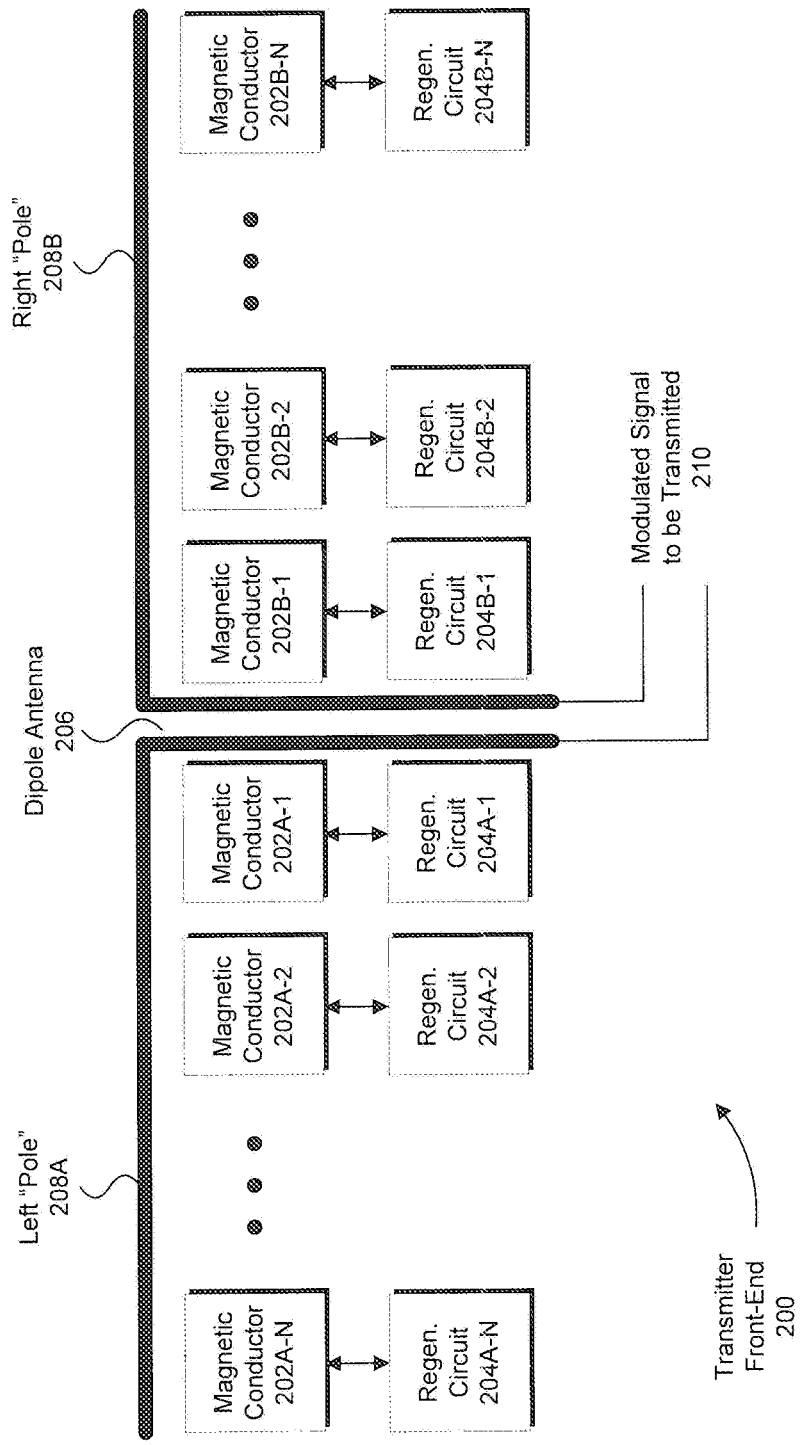
FIG. 2A illustrates at least a portion of a transmitter front-end in accordance with embodiments of the present disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview and Exemplary Operating Environment

The present disclosure is directed to a transmitter front-end for wireless chip-to-chip communication and for other, longer-range communication (e.g., several meters or several tens of meters) between devices. The transmitter front-end can include a plurality of reflector power amplifiers implemented on and/or in an IC chip (i.e., on-chip) and an antenna implemented on the same IC chip as the reflector power amplifiers or on and/or in the package (i.e., on-package) containing the same IC chip as the reflector power amplifiers. The antenna is configured to wirelessly transmit a signal to another IC chip or device. The reflector power amplifiers are configured to reflect the radiation of the on-chip or on-package antenna in such a way that the effective radiation pattern of the antenna is reinforced in a desired direction and suppressed in an undesired direction. This helps to reduce the required output power of the transmitter front-end and mitigate interference with other potential wireless chip-to-chip or longer-range communications.

FIG. 1 illustrates an exemplary multi-chip device 100 in which embodiments of the transmitter front-end described above can be implemented. Multi-chip device 100 can be, for example, a desktop computer, a laptop, a tablet, a smart phone, a set-top box, or a gaming system. As shown in FIG. 1, multi-chip device 100 includes a PCB or a module (e.g., a box) 102 containing multiple IC chips 104-1 through 104-4. In the multi-chip device 100, the IC chips 104-1 through 104-4 are required to communicate with each other at high data rates (e.g., in the multi Gb/s range) in order to carry out the designed for functionalities of the multi-chip device 100. However, other data rates (e.g., below a Gb/s) are also possible. It should be noted that, in other embodiments, chips 104-1 through 104-4 can be implemented in separate devices (as opposed to being contained on the same PCB or in the same module of a device) and can be required to communicate with each other (or other devices) at distances of several meters or several tens of meters, for example.

In order to perform inter-chip communications, each IC chip 104-1 through 104-4 includes a respective transmitter front-end 106-1 through 106-4. These transmitter front-ends 106-1 through 106-4 are configured to wirelessly transmit a signal with a carrier frequency in the range of 30 to 300 GHz or above, for example. The signal to be transmitted can be modulated with data intended for reception by another one of the IC chips 104-1 through 104-4 or some remote device. Signals with frequencies in the range 30 to 300 GHz have a wavelength of ten to one millimeter and are often referred to as millimeter wave signals. At these small wave lengths, a small length on-package or even on-chip antenna can be used to wirelessly transmit the modulated signal to another one of the IC chips 104-1 through 104-4 or some remote device.

In one embodiment, the transmitter front-ends 106-1 through 106-4 are configured to wirelessly transmit a modulated signal with a carrier frequency in the range of 57-64 GHz if the multi-chip device 100 is intended for operation in the United States or Canada. In another embodiment, the transmitter front-ends 106-1 through 106-4 are configured to wirelessly transmit a modulated signal with a carrier frequency in the range 59-66 GHz if the multi-chip device 100 is intended for operation in Japan.

An antenna (not shown) and a plurality of reflector power amplifiers (also not shown) are included in each transmitter front-end 106-1 through 106-4. The plurality of reflector power amplifiers are configured to amplify and reflect the modulated signal radiated by their associated antenna and, at the same time, adjust the phase of the reflected, modulated signal by a set or adjustable amount such that the effective radiation pattern of the antenna is reinforced in a desired direction and suppressed in an undesired direction. This helps to reduce the required output power of the transmitter front-end and mitigate interference with other potential wireless chip-to-chip or longer-range communications. The antenna can be implemented on-chip or on-package.

To prevent collisions and to effectively share the available wireless bandwidth between the IC chips 104-1 through 104-4, one of the IC chips can be configured to act as a master device to coordinate transmissions from the other IC chips, configured as slave devices. For example, the IC chip 104-1 can acts as a master device to coordinate transmissions from the other IC chips, such that the available wireless bandwidth is effectively shared between them and collisions are avoided. The master IC chip can grant access to the available wireless bandwidth to each slave IC chip for a limited interval of time—the duration of which can be determined based on an amount of data that is waiting to be wirelessly transmitted by each slave IC chip. In other embodiments, a contention based media access control protocol can be implemented by the IC chips 104-1 through 104-4 to perform wireless chip-to-chip communication. For example, a contention based media access control protocol similar to carrier sense multiple access used in Ethernet can be used. In yet another embodiment, the IC chips 104-1 through 104-4 are assigned non-overlapping transmission bandwidths over which wireless chip-to-chip communication can be performed.

2. Transmitter Front-End with Reflector Power Amplifiers

FIG. 2A illustrates at least a portion of a transmitter front-end 200 in accordance with embodiments of the present disclosure. The transmitter front-end 200 can be used, for example, to implement one or more of the transmitter front-ends 106-1 through 106-4 in FIG. 1. As shown in FIG. 2A, the transmitter front-end 200 includes a plurality of magnetic conductors 202A-1 through 202A-N and 202B-1 through 202B-N, a plurality of regeneration circuits 204A-1 through 204A-N and 204B-1 through 204B-N, and a dipole antenna 206 with a left "pole" 208A and a right "pole" 208B. The plurality of magnetic conductors 202 and the plurality of regeneration circuits 204 can be implemented on and/or in the substrate of an IC chip (i.e., on-chip), and the dipole antenna 206 can be implemented on the same IC chip or, alternatively, on and/or in the package containing the IC chip (i.e., on-package).

Each magnetic conductor 202, as shown in FIG. 2A, is paired with a corresponding one of the plurality of regeneration circuits 204. Together, each pair forms what is referred to as a reflector power amplifier. For example, the magnetic conductor 202A-1 is paired with the regeneration circuit 204A-1 and together they form one reflector power amplifier. However, it should be noted that, in some embodiments, regeneration circuits 204 can be omitted and the magnetic conductors 202 themselves can form reflectors.

In operation of the transmitter front-end 200, the dipole antenna 206 is configured to receive a signal to be transmitted 210 with a carrier frequency in the range of 30 to 300 GHz or above, for example. Signals with frequencies in the range 30 to 300 GHz have a wavelength of ten to one millimeter and, as noted above, are often referred to as millimeter wave signals. At these small wave lengths, the short length on-chip or on-package dipole antenna 206 becomes possible. The signal to be transmitted 210 is further modulated with data intended for reception by a nearby IC chip or device.

In one embodiment, the modulated signal to be transmitted 210 by the dipole antenna 206 has a carrier frequency in the range 57-64 GHz if the device in which the transmitter front-end 200 is implemented is intended for operation in the United States or Canada. In another embodiment, the modulated signal to be transmitted 210 by the dipole antenna 206 has a carrier frequency in the range 59-66 GHz if the device in which the transmitter front-end 200 is implemented is intended for operation in Japan.

After the modulated signal to be transmitted 210 is radiated by the dipole antenna 206, a portion of the radiated signal impacts the surface of the magnetic conductors 202. The magnetic conductors 202 are configured to reflect and adjust a phase of at least a portion of the radiated signal that impacts their surfaces. A flat electrical conductor, such as a flat sheet of metal, has a low surface impedance (given by the ratio of the voltage to current along the conductor) and the phase of the radiated signals that hit its surface are, as a result, reversed by substantially 180 degrees upon being reflected. The magnetic conductors 202, in contrast, have comparatively higher surface impedances. The higher surface impedance of the magnetic conductors 202 is formed using a capacitive and inductive element arranged as a parallel resonant LC circuit. The parallel resonant LC circuit acts as a filter to block or reduce the flow of current along the surface of the magnetic conductors 202. The higher impedance surfaces of the magnetic conductors 202 reflect radiated signals that hit their surfaces like normal electrical conductors, but the phase of the reflected radiated signals are not reversed by 180 degrees. The impedance of the LC circuit, as seen by the radiated signal, is generally dependent on the inductance and capacitance of the LC circuit and the frequency of the radiated signal. For example, if the frequency of the radiated signal matches the resonant frequency of LC circuit, determined by its inductance and capacitance, the impedance of the LC circuit as seen by the radiated signal will be theoretically infinite and the phase shift of the reflection will be substantially zero.

The capacitance and/or inductance of the parallel resonant LC circuits that form, at least in part, each of the magnetic conductors 202 can be independently determined or adjusted to perform beamforming. For example, the capacitance and/or inductance of the parallel resonant LC circuits that form, at least in part, each of the magnetic conductors 202 can be independently determined or adjusted such that the reflected signals from each surface constructively and destructively interfere based on their respective phases, and the effective radiation pattern of the dipole antenna 206 is reinforced in a desired direction and suppressed in an undesired direction. This helps to reduce the required output power of the transmitter front-end 200 and mitigate interference with other potential wireless chip-to-chip or longer-range communications. The regeneration circuits 204 can be used to amplify or regenerate the signals impacting one or more of the magnetic conductors 202 before the signals are reflected.

Figure 2B:
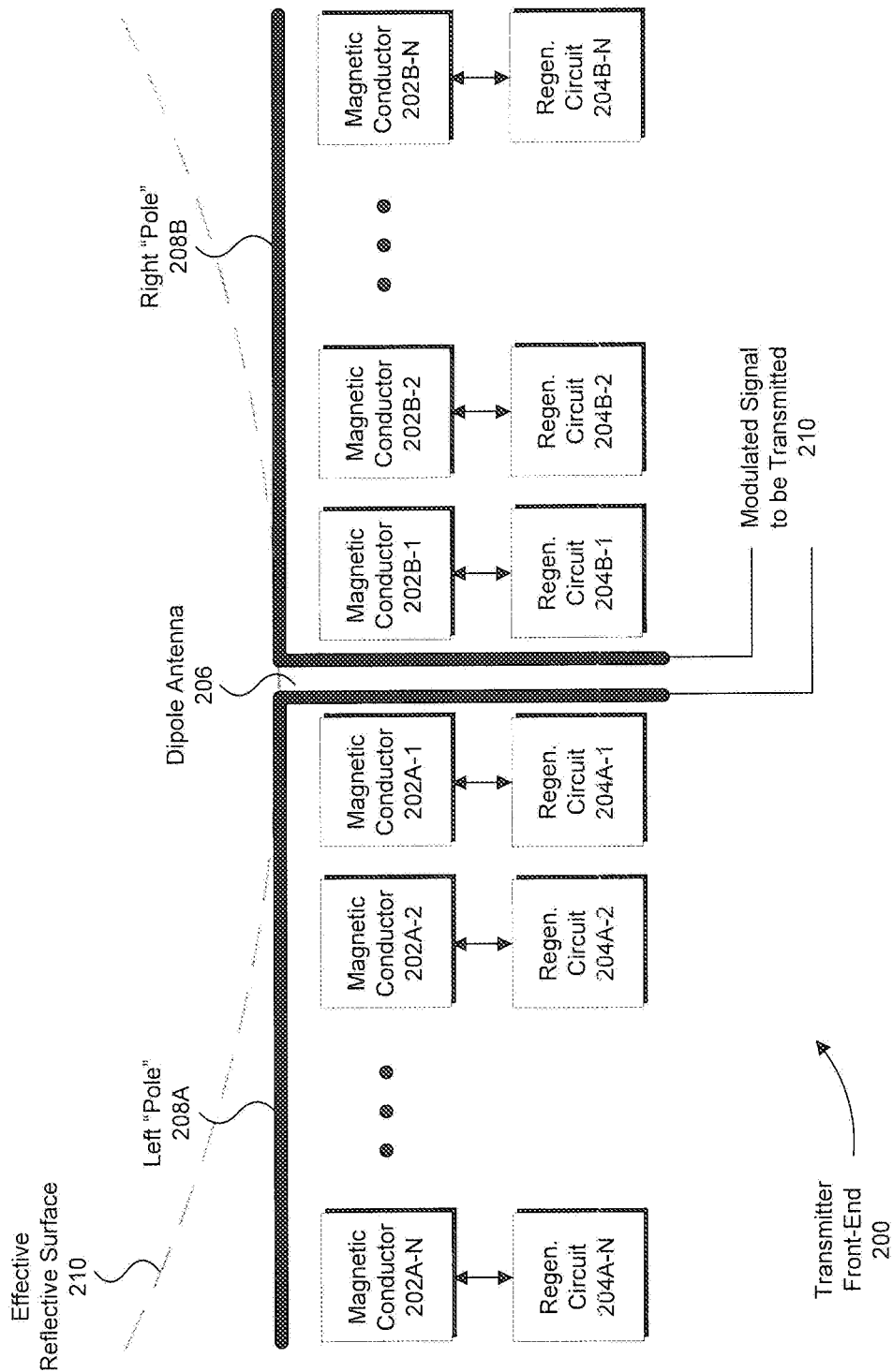
FIG. 2B illustrates one effective reflective surface by the transmitter front-end in FIG. 2A in accordance with embodiments of the present disclosure.

FIG. 2B illustrates one effective reflective surface 210 that can be formed by independently determining or adjusting the capacitance and/or inductance of the parallel resonant LC circuits that make up, at least in part, each of the magnetic conductors 202. As shown, the effective reflective surface 210 is parabolic in shape and can be used to focus the signal radiated by the dipole antenna 206 and reflected off of the surfaces of the magnetic conductors 202 to a point.

Referring now to FIG. 3, an exemplary reflector power amplifier 300 is illustrated in accordance with embodiments of the present disclosure. The reflector power amplifier 300 includes a magnetic conductor 202, a regeneration circuit 204, and a current source 302. The magnetic conductor 202 includes an inductor 304 and a capacitor 306 that together form a parallel resonant LC circuit. As shown in FIG. 3, the capacitor 306 can be configured to have an adjustable capacitance controlled by a reflection phase control signal 308. By adjusting the capacitance of the parallel resonant LC circuit of the magnetic conductor 202, the phase of the reflected signal impacting its surface can be adjusted. In other embodiments, the capacitor 306 is not adjustable and/or the inductance of inductor 304 is made adjustable.

In operation of reflector power amplifier 300, a radiated signal is received by reflector power amplifier via inductor 304 and is phase adjusted based on the frequency of the radiated signal and the impedance of the parallel resonant LC circuit. Before being reflected, the phase adjusted signal can be amplified or regenerated using the regeneration circuit 204. As shown in FIG. 3, the regeneration circuit 204 includes transistors M1 and M2 that have been cross coupled in a positive feedback configuration. Specifically, transistors M1 and M2 are n-type metal-oxide semiconductor field effect transistors (MOSFETs), where the gate of each transistor has been connected to the other transistors drain. The source of each transistor is connected to a supply voltage VSS through current source 302. Supply voltage VSS is either at ground or a negative potential relative to a supply voltage VDD coupled to a center tap of inductor 304. Current source 302 is generally used to bias transistors M1 and M2. Transistors M1 and M2 form a common-source amplifier with a complex, tuned load that includes magnetic conductor 202. Through the cross coupled pair, the regeneration circuit 204 is configured to provide a negative resistance to offset the losses incurred by the positive, finite resistance of the complex, tuned load. The negative resistance is substantially equal to $-2/g_m$, where $g_m$ represents the transconductance of transistors M1 and M2.

It should be noted that other implementations of the regeneration circuit 204 that include different transistor types to implement the cross coupled pair, such as p-type MOSFETs, or a different implementation all together can be used.

Figure 4A:
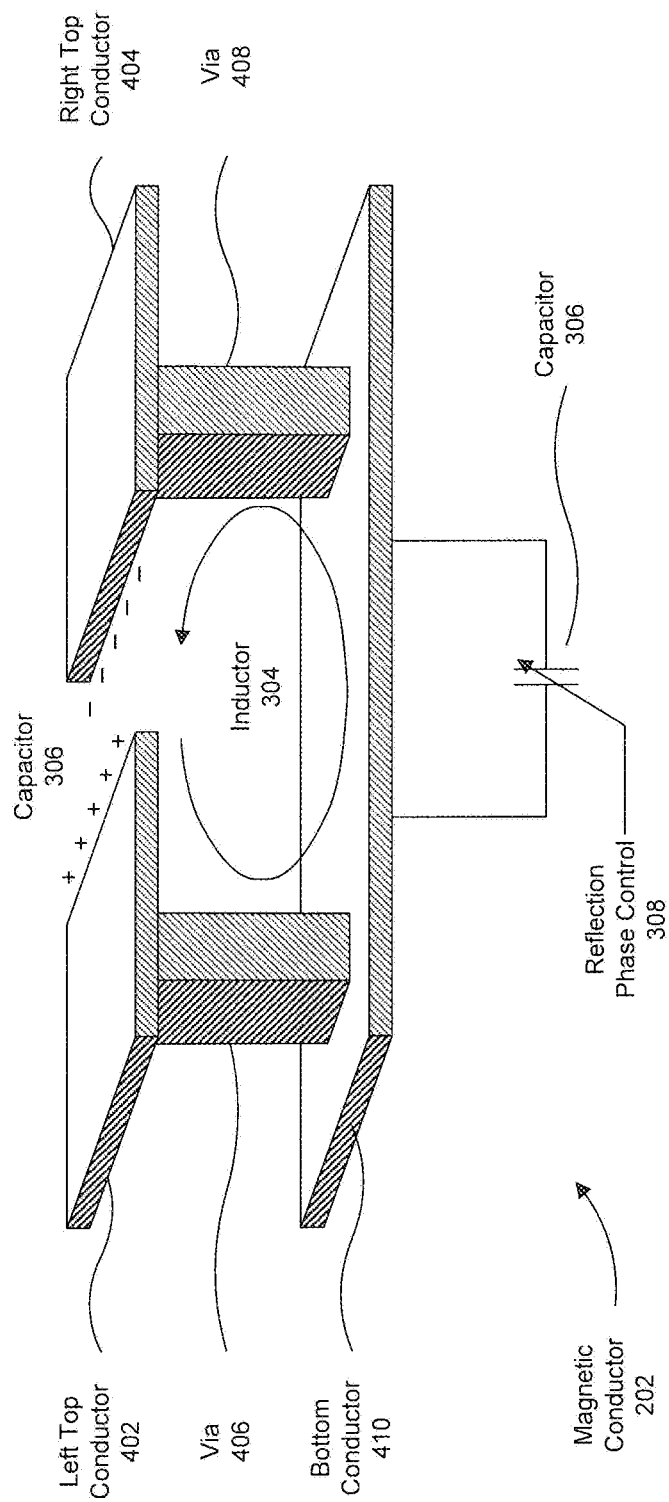
FIG. 4A illustrates an exemplary implementation of a magnetic conductor in accordance with embodiments of the present disclosure.
Figure 4B:
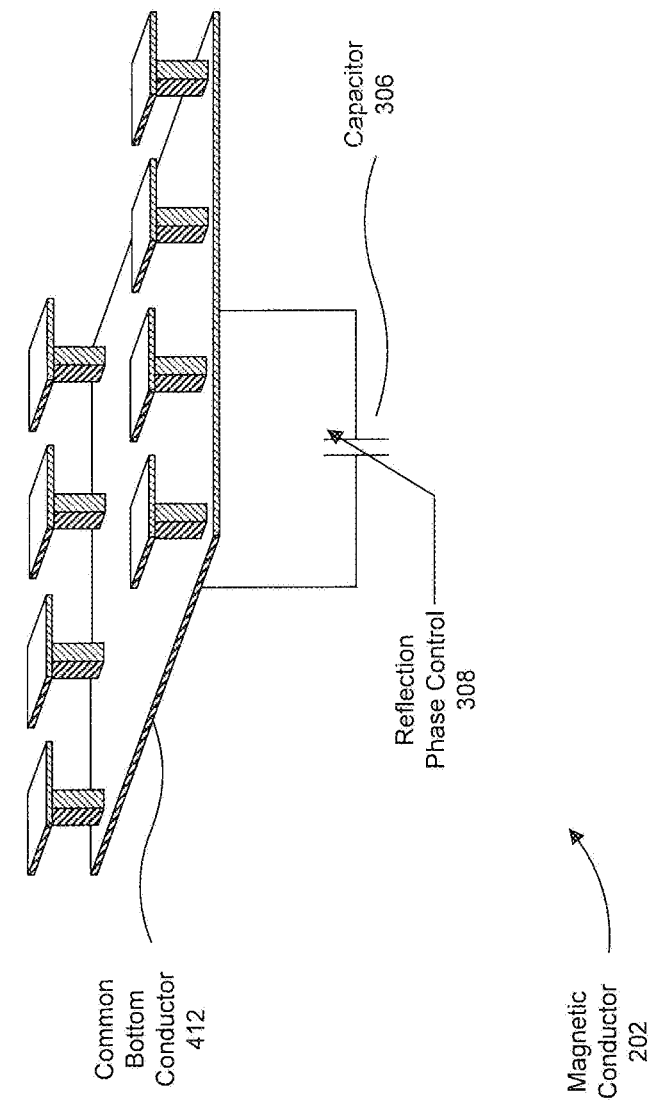
FIG. 4B illustrates another exemplary implementation of a magnetic conductor in accordance with embodiments of the present disclosure.

Referring now to FIG. 4A, an exemplary implementation, at least in part, of magnetic conductor 202 is illustrated in accordance with embodiments of the present disclosure. As shown in FIG. 4A, the magnetic conductor includes a left top conductor 402, a right top conductor 404, vias 406 and 408, and a bottom conductor 410. The top left conductor 402 and the top right conductor 404 can be implemented in one metal layer of an IC chip and the bottom conductor 410 can be implemented in another, lower-level metal layer of the IC chip. The two top conductors 402 and 404 are adjacent to each other, but not touching, and are connected to the bottom conductor 410 by respective vias 406 and 408. The vias 406 and 408 represent electrical connections between the different metal layers of the IC chip. The two conductors 402 and 404 form at least a portion of the capacitor 306, shown in FIG. 3, and the total structure forms at least a portion of the inductor 304, also shown in FIG. 3. In addition, the capacitor 306 can include an additional, programmable portion (shown at the bottom of FIG. 4A) that can be controlled by the reflection phase control signal 308. This programmable portion of capacitor 306 can be implemented as a bank of capacitors or as a varactor, for example. FIG. 4B further illustrates that the basic structure of a top conductor and via, such as top left conductor 402 and via 406 shown in FIG. 4A, can be replicated several times and placed in an array on a common bottom conductor 412 to form one magnetic conductor.

It should be noted that, although the top conductors in FIG. 4A and 4B are shown as being square or rectangular in shape, other geometric configurations can be used for the top conductors. For example, hexagons, pentagons, and triangles can be used. The top conducts can also be replaced with inductors, each with one or more turns.

3. Conclusion

The present disclosure has been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

What is claimed is:

1. A multi-chip device comprising:
a first integrated circuit (IC) chip; and a second IC chip comprising an antenna and a plurality of reflector power amplifiers configured to reflect and adjust a phase of a signal transmitted by the antenna to the first IC chip such that an effective radiation pattern of the antenna is reinforced in a direction of the first IC chip relative to a location of the second IC chip.

2. The multi-chip device of claim 1, wherein the first IC chip and the second IC chip are on a printed circuit board.

3. The multi-chip device of claim 1, wherein at least one of the plurality of reflector power amplifiers comprises a magnetic conductor configured to reflect and adjust the phase of the signal transmitted by the antenna and a regeneration circuit configured to amplify the signal transmitted by the antenna and reflected by the at least one of the plurality of reflector power amplifiers.

4. The multi-chip device of claim 3, wherein the magnetic conductor further comprises:
an inductor; and
a capacitor.

5. The multi-chip device of claim 4, wherein a capacitance of the capacitor is configured to be adjusted to adjust the phase of the signal transmitted by the antenna.

6. The multi-chip device of claim 3, wherein the magnetic conductor comprises:
a first metal plate on a first layer of the second IC chip;
a second metal plate adjacent to, but not in direct contact with, the first metal plate on the first layer of the second IC chip; and
a third metal plate, on a second layer of the second IC chip, coupled to the first and second metal plates via respective electrical connections between the first and second layer of the second IC chip.

7. The multi-chip device of claim 1, wherein the plurality of reflector power amplifiers are configured to reflect and adjust the phase of the signal transmitted by the antenna such that radiation of the antenna is reflected by an effective parabolic surface.

8. The multi-chip device of claim 3, wherein the regeneration circuit comprises a pair of cross-coupled transistors.

9. The multi-chip device of claim 1, wherein the antenna is a dipole antenna.

10. The multi-chip device of claim 1, wherein the signal transmitted by the antenna has a wavelength of ten millimeters to one millimeter.

11. A multi-chip device comprising:
a first integrated circuit (IC) chip; and
a second IC chip comprising:
an antenna,
a magnetic conductor configured to reflect and adjust a phase of a signal transmitted by the antenna to the first IC chip such that an effective radiation pattern of the antenna is reinforced in a direction of the first IC chip relative to a location of the second IC chip; and
a regeneration circuit configured to amplify the signal transmitted by the antenna and reflected by at least one of a plurality of reflector power amplifiers.

12. The multi-chip device of claim 11, wherein the first IC chip and the second IC chip are on a printed circuit board.

13. The multi-chip device of claim 11, wherein the magnetic conductor further comprises:
an inductor; and
a capacitor.

14. The multi-chip device of claim 13, wherein a capacitance of the capacitor is configured to be adjusted to adjust the phase of the signal transmitted by the antenna.

15. The multi-chip device of claim 11, wherein the magnetic conductor comprises:
a first metal plate on a first layer of the second IC chip;
a second metal plate adjacent to, but not in direct contact with, the first metal plate on the first layer of the second IC chip; and
a third metal plate, on a second layer of the second IC chip, coupled to the first and second metal plates via respective electrical connections between the first and second layers of the second IC chip.

16. The multi-chip device of claim 11, wherein the magnetic conductor is configured to reflect and adjust the phase of the signal transmitted by the antenna such that radiation of the antenna is reflected by an effective parabolic surface.

17. The multi-chip device of claim 11, wherein the regeneration circuit comprises a pair of cross-coupled transistors.

18. The multi-chip device of claim 11, wherein the antenna is a dipole antenna.

19. The multi-chip device of claim 11, wherein the signal transmitted by the antenna has a wavelength of ten millimeters to one millimeter.

20. A printed circuit board comprising:
a first integrated circuit (IC) chip; and
a second IC chip comprising an antenna and a plurality of reflector power amplifiers configured to reflect and adjust a phase of a signal transmitted by the antenna to the first IC chip such that an effective radiation pattern of the antenna is reinforced in a direction of the first IC chip relative to a location of the second IC chip,
wherein at least one of the plurality of reflector power amplifiers comprises a magnetic conductor configured to reflect and adjust the phase of the signal transmitted by the antenna and a regeneration circuit configured to amplify the signal transmitted by the antenna and reflected by the at least one of the plurality of reflector power amplifiers.

* * * * *